(12) United States Patent
Williston et al.

(10) Patent No.: US 9,782,034 B2
(45) Date of Patent: Oct. 10, 2017

(54) DISPENSER FOR GRANULAR MATERIAL WITH A VALVE ASSEMBLY

(71) Applicant: A.C. Dispensing Equipment Inc., Lower Sackville (CA)

(72) Inventors: Kyle Williston, Dartmouth (CA); Jeffrey Tofflemire, Head of Chezzetcook (CA); Ken MacGillivary, Oakfield (CA); Ian MacLean, Fall River (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 0 days.

(21) Appl. No.: 14/928,381

(22) Filed: Oct. 30, 2015

(65) Prior Publication Data

US 2017/0119199 A1 May 4, 2017

(51) Int. Cl.
  *A47J 31/40* (2006.01)
  *B65D 83/06* (2006.01)
  *F16K 7/06* (2006.01)

(52) U.S. Cl.
  CPC ............ *A47J 31/404* (2013.01); *B65D 83/06* (2013.01); *F16K 7/06* (2013.01)

(58) Field of Classification Search
  CPC ........... A47J 31/404; F16K 7/06; B65D 83/06
  (Continued)

(56) References Cited

U.S. PATENT DOCUMENTS 1,908,117 A * 5/1933 Clapp .................... F16N 13/00
                                                        222/192
2,800,252 A   7/1957 Wahl
(Continued)

FOREIGN PATENT DOCUMENTS

CA    2667383 C    9/2014
CA    2858015 A1   2/2015
(Continued)

OTHER PUBLICATIONS

Canadian Patent Application No. 2910814, Office Action dated Oct. 14, 2016.
(Continued)

*Primary Examiner* — Donnell Long
(74) *Attorney, Agent, or Firm* — Borden Ladner Gervais LLP; Jeffrey Coghlan

(57) ABSTRACT

Described herein is an apparatus and method for dispensing a granular material. The apparatus includes a hopper for storing the granular material and a feeder for delivering the granular material through a hopper outlet to a dispensing tube that is configured to guide the granular material towards a dispensing outlet. The valve assembly is actuatable to pinch and unpinch the dispensing tube, thereby blocking and unblocking the passage of material. The valve assembly is configured to receive a resilient portion of the dispensing tube, and is actuatable to pinch the resilient portion of the dispensing tube to inhibit passage of the granular material to the dispensing port, and to unpinch said resilient portion of the dispensing tube to enable passage of the granular material through the dispensing port. The dispensing tube may be sloped between the hopper outlet and the valve assembly. Sloping of the dispensing tube promotes sliding of the granular material along an inner surface of the dispensing tube. This focuses the flow profile of the granular material, and reduces the scattering of granular material outside the vessel.

20 Claims, 14 Drawing Sheets

(58) Field of Classification Search
USPC ..... 222/412, 413, 214, 424.5, 425, 434, 450
See application file for complete search history.

(56) References Cited

U.S. PATENT DOCUMENTS

| | | | |
|---|---|---|---|
| 3,539,081 A * | 11/1970 | Norton | B67D 3/041 |
| | | | 222/185.1 |
| 3,671,020 A | 6/1972 | Krup | |
| 4,015,780 A | 4/1977 | Hall | |
| 4,572,060 A | 2/1986 | Yung-Kuan | |
| 4,665,862 A * | 5/1987 | Pitchford, Jr. | A01K 5/0275 |
| | | | 119/51.11 |
| 4,974,751 A | 12/1990 | King | |
| 5,013,499 A | 5/1991 | Willard | |
| 5,217,108 A | 6/1993 | Newman | |
| 5,328,015 A | 7/1994 | Volk, Jr. et al. | |
| 5,330,078 A | 7/1994 | Ficken et al. | |
| 5,581,982 A | 12/1996 | Schroeder et al. | |
| 5,871,619 A | 2/1999 | Finley et al. | |
| 5,927,553 A | 7/1999 | Ford | |
| 5,952,032 A | 9/1999 | Mordini et al. | |
| 5,975,357 A | 11/1999 | Topar | |
| 5,980,969 A | 11/1999 | Mordini et al. | |
| 6,182,555 B1 | 2/2001 | Scheer et al. | |
| 6,874,660 B2 | 4/2005 | Bertone | |
| 6,969,214 B2 | 11/2005 | Lichtblau | |
| 2006/0071037 A1 | 4/2006 | Pickrell | |
| 2010/0065587 A1 * | 3/2010 | Erman | A47J 31/404 |
| | | | 222/413 |
| 2010/0314419 A1 * | 12/2010 | Real | A47J 31/401 |
| | | | 222/236 |
| 2012/0088022 A1 * | 4/2012 | Carbone | A23L 2/39 |
| | | | 426/506 |

FOREIGN PATENT DOCUMENTS

| | | |
|---|---|---|
| WO | 2004041043 | 5/2004 |
| WO | 2010148160 A2 | 12/2010 |

OTHER PUBLICATIONS

PCT Patent Application No. PCT/CA2007/001897 International Search Report dated Feb. 11, 2008.
Canadian Patent Application No. 2,910,814 Office Action dated May 25, 2016.
Intenational Patent Application No. PCT/CA2016/051238, International Search Report and Written Opinion dated Jan. 10, 2017.

* cited by examiner

DISPENSER FOR GRANULAR MATERIAL WITH A VALVE ASSEMBLY

FIELD

The present disclosure relates generally to dispensing machines for dispensing granular materials such as powders. More particularly, the present disclosure relates to a dispenser having increased dispensing accuracy.

BACKGROUND

Self-contained automated brewing and beverage dispensing devices are well known in the food and beverage industry and are commonly found in cafeterias, restaurants and coffee shops. Such dispensing devices are particularly popular in locations where patrons want freshly brewed drinks but the owner of the establishment does not have the staffing resources or the equipment and ingredients required to make them.

Most brewing and dispensing machines contain a number of dispensers for dispensing a measured quantity of a granulated food or beverage concentrate, or a beverage additive, such as sugar or flavouring, allowing users to adapt the dispensed drinks to their individual tastes. Control of dispensing volume may be an available feature of the dispensing equipment having the advantage of rendering a consistent product when a customer orders a standard order such as "one sugar" or "double sugar", for example. In response to the user's input, such a dispenser will dispense a predetermined amount of the requested powder, thereby ensuring consistency of the final product between orders.

It is known from the prior art that the mechanics behind the dispensing of granular materials, such as powders, often involve a rotating auger member driven by a motor, whereby the auger's action causes a volume of powder to be moved to a discharge port. Augers can be of a conveyor type, most of which have a helical shaped flight along a length of a shaft with a predetermined pitch. The flight of the auger (i.e. the distance between the uprights in the auger) may be calculated to allow for moving a specific amount of powder from a hopper to a discharge port. For example, one full revolution of the auger can be calibrated to dispense the powder in a single pitch of the flight. When a full pitch is dispensed, the bottom edge of the flight is substantially positioned adjacent to the opening edge of the port, hence there is little to no non-dispensed powder remaining.

However, the hopper-and-auger combinations taught by the prior art lead to some difficulties. If the auger does not make a full revolution dispensing inaccuracies will occur. This is because the non-dispensed powder is positioned between a rear flight edge and the port and is prone to cascading in an "avalanche" effect if the machine is accidentally jostled, which is likely in most service industry environments where such a dispensing machine would be used. This is referred to as a "high-low" effect, because the first dispense operation will provide more than the desired amount of powder, while the next dispense operation will provide less than the desired amount of powder since some of it has been inadvertently dispensed in the first dispense operation.

Another issue with prior art dispensers is "dribbling" of granular material from a dispensing port. In certain prior art dispensers, undispensed power sits near the discharge port, and can fall out if the machine is jostled when not in use. If there is not a cup or receptacle underneath the outlet, the material may fall onto a counter supporting the dispenser. This can lead to wasted material and to increased expense as cleanup is required. In addition, suspended clumps may form if the material is left undisturbed for a period of time. These clumps will break apart and fall through the discharge port if the machine is jostled or bumped while not in use.

It is known in the prior art that mounting the auger at a positive angle with respect to the discharge port helps minimize "dribbling" of granular material, as gravity will force any undispensed granular material against a back surface of a flight in the auger. However, this configuration results in strain on the rear bushing as the material in the hopper will descend towards a rear portion of the hopper where the bushing is positioned that allows the auger to rotate via an externally mounted motor. More specifically, the material can cause aggressive wear on the rear bushing, thereby requiring frequent replacement and/or maintenance. Dribbling of powder may further be minimized by back-driving, or reversing the auger, for example by a ½ revolution, such that any non-dispensed powder is withdrawn from the discharge port. However, backdriving of the motor exacerbates bushing wear.

Furthermore, in some dispensers known in the prior art, powdered material to be dispensed is discharged through a vertically oriented channel. In such configurations, dispensed material strikes the sides of the channel and scatters as it exits. This is sometimes referred to as "overspray". As a result, not all of the powdered material that is measured to be dispensed, lands in the vessel intended to receive the material and instead, lands on the counter. Thus, the accuracy of the dispense is reduced. Cleaning up of the mess on the counter leads to aggravation and expense of effort by the user, the owner, or the operator of the dispenser, and extra cost to the operator as additional staff may be needed to assist in the cleaning.

It is, therefore, desirable to provide a dispenser system for granular material that accurately dispenses fine powders and other granular materials.

SUMMARY

It is an object of the present disclosure to obviate or mitigate at least one disadvantage of previous dispensers. The present invention is directed to a dispensing apparatus for granular materials that may be used in retail outlets which sell beverages capable of receiving additives. The dispensing apparatus may be operated by the retailer's employees or by the customer. The system dispenses granulated material, such as powders, using a feeder powered by a driving motor that is responsive to a user's request. The feeder transfers an amount of the granular material from a hopper to a dispensing tube. The dispensing apparatus includes a valve assembly, coupled to the dispensing tube which moves between a closed position and a dispensing, or open, position. At the beginning of the dispense, the valve assembly is in the closed position wherein, in certain embodiments, a pinch bar pinches the dispensing tube and inhibits the passage of the granular material to a dispensing port. An initial amount of the granular material is then fed by the feeder into the dispensing tube for a time sufficient to allow the material to accumulate in the dispensing tube. The valve is then opened and the granular material is dispensed through the dispensing port. In cases where a predetermined amount is to be dispensed, the feeder will continue feeding until the predetermined amount is fed into the dispensing tube and dispensed through the dispensing port. The valve is then closed, preventing the inadvertent dispensing of any granular material if the machine is bumped between dispenses.

By allowing the granular material to accumulate in the dispensing tube before that valve is opened for the dispense, the dispense pattern of the powder is columnated. It has been found that columnating the powder improves the flow characteristics of the powder and leads to less waste of powder as the powder is dispensed as a unit. This is in contrast to the "scatter pattern" that is created when the granular material bounces off the walls of the dispensing tube when the powder is not columnated. Delaying the opening of the valve until the granular material has been fed into the dispensing tube leads to a reduction in overspray of the dispensed material due to scattering, resulting in increased accuracy of dispensing.

The dispensing tube may have a sloped path between the hopper outlet and the valve, which promotes sliding of the granular material along an inner surface of the dispensing tube. This focuses the flow profile of the granular material, and promotes accuracy of dispensing as it reduces the scattering of granular material outside the vessel. In contrast, granular material that is dispensed through a vertical dispensing tube bounces off the sides of the tube leading to scattering of the material outside the receptacle, leading to inaccurate dispensing and waste.

Disclosed herein is a dispensing apparatus configured to dispense a granular material, the dispensing apparatus comprising a hopper configured to store the granular material; a feeder configured to deliver the granular material in the hopper from a hopper outlet; a sloped dispensing tube configured to receive the granular material from the hopper outlet and configured to guide the granular material towards a dispensing port; and a valve assembly coupled to the sloped dispensing tube and positioned between the hopper outlet and the dispensing port, the valve assembly configured to receive a resilient portion of the dispensing tube, the valve assembly being actuated to pinch the resilient portion of the dispensing tube to inhibit passage of the granular material to the dispensing port, and to unpinch said resilient portion of the dispensing tube to enable passage of the granular material through the dispensing port.

In an embodiment the dispensing tube may be angled from the hopper outlet to the valve assembly for guiding the granular material in an inclined path between the hopper outlet and the valve assembly. In an alternate embodiment, the dispensing tube has a curved path portion between the hopper outlet and the valve assembly for guiding the granular material in a curved path from the hopper outlet to the valve assembly.

The feeder may be oriented substantially horizontally relative to a surface supporting the dispenser or the feeder may be oriented at an angle relative to a surface supporting the dispenser. The feeder may be an auger configured to feed a predetermined amount of the granular material to the dispensing tube. The hopper may comprise a U-shaped bottom section for housing the auger; and the dispenser may further comprise an auger cover member coupled to the hopper, wherein the base of the hopper and the cover member cooperate to enclose an end portion of the auger.

In an embodiment, the dispensing tube may be resilient in its entirety. The valve assembly may be a pinch valve assembly. The pinch valve assembly comprises a body comprising a stop plate; and a pinch bar assembly configured to move a pinch bar between a closed position and a dispensing position; wherein, when the pinch bar is positioned in the closed position the pinch bar presses against the resilient portion of the dispensing tube which is positioned between the pinch bar and the stop plate thereby deforming the resilient portion of the dispensing tube and inhibiting the passage of the granular material to the dispensing port. When the pinch bar is in the open position, the pinch bar moves away from the stop plate, allowing the tube to reform its original shape and allowing the passage of the granular material through the dispensing port. In a further embodiment, the pinch bar comprises a rounded tip for pressing against the resilient portion of the dispensing tube.

In an embodiment, the valve body further comprises a valve block, the valve block defining a passage configured to receive the resilient portion of the dispensing tube, and wherein the stop plate is defined by an inner wall of the body defining the passage. The valve block may further comprise a channel substantially perpendicular to the defined passage, the channel for receiving the pinch bar and aligning the pinch bar with the stop plate.

Also disclosed herein is a method of dispensing a granular material. The method comprises feeding the granular material from a hopper through a hopper outlet into a dispensing tube that is closed by a valve; opening the valve to dispense the granular material through a dispensing port in the dispensing tube; and closing the valve to inhibit the passage of the granular material through the dispensing tube to a dispensing port.

The opening step may include opening the valve before feeding of the entire predetermined amount of the granular material stops. The opening may include opening the valve after feeding of the predetermined amount of the granular material stops. The step of closing the valve may comprise actuating a pinch bar to pinch a resilient portion of the dispensing tube, and the step of opening the valve may comprise actuating the pinch bar to unpinch the resilient portion of the dispensing tube to enable passage of the granular material through the dispensing port. The granular material may travel along a sloped path from the hopper outlet to the valve.

Also disclosed herein is a dispensing apparatus configured to dispense a granular material comprising: a hopper configured to store the granular material; an auger oriented substantially horizontally relative to a surface supporting the dispenser and configured to deliver the granular material in the hopper from a hopper outlet; a dispensing tube configured to receive the granular material from the hopper outlet and configured to guide the granular material towards a dispensing port; and a valve assembly coupled to the dispensing tube and positioned between the hopper outlet and the dispensing port, the valve assembly configured to receive a resilient portion of the dispensing tube; and at least one auger cover member coupled to the hopper, the at least one auger cover member cooperating with the hopper to enclose a portion of the auger towards the dispensing port. The valve assembly is actuatable to pinch the resilient portion of the dispensing tube to inhibit passage of the granular material to the dispensing port, and to unpinch said resilient portion of the dispensing tube to enable passage of the granular material through the dispensing port.

BRIEF DESCRIPTION OF THE DRAWINGS

Embodiments of the present disclosure will now be described, by way of example only, with reference to the attached Figures.

FIG. 1 is a profile cross section of a dispenser known from the prior art;

FIG. 2 is a block diagram of a dispenser as described herein;

DETAILED DESCRIPTION

Generally, the present disclosure provides a method and apparatus for dispensing granular material.

Figure 1:
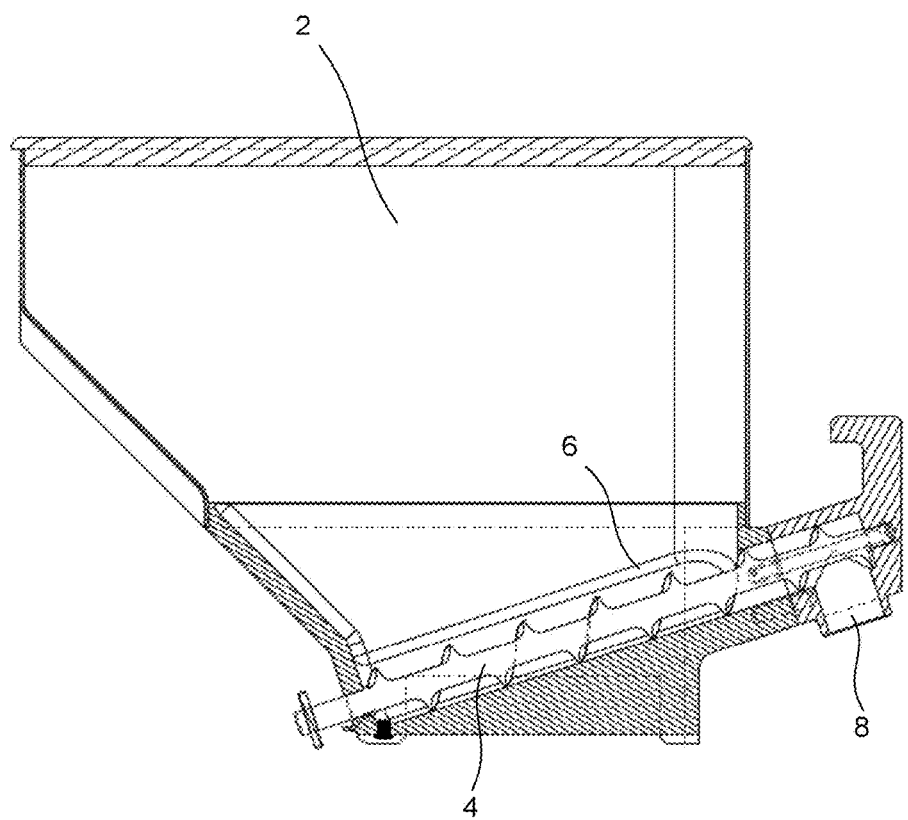

FIG. 1 shows a profile cross-sectional view of a dispensing unit known from the prior art. The unit includes a removable hopper 2 for storing granular material, an auger member 4, and a motor unit (not shown) coupled to the auger. The base 6 of the hopper is inclined positively toward the dispensing port 8. The auger is rotatable in the inclined base of the hopper and the motor rotates the auger to move the powder in an upward direction towards the dispensing port 8. The angled incline allows gravity to retain granular material at the back end of the auger member, more specifically the flight, after the auger member has stopped rotating. However as previously mentioned, powder that is not dispensed migrates downward into the rear bushing which aggressively wears the rear bushing, resulting in damage that is repaired only by replacement of this part.

Dribbling of powder is further minimized in the prior art dispenser shown in FIG. 1 by backdriving, or reversing the auger member by a 0.5 revolution rotation such that any non-dispensed powder is withdrawn from the dispensing port 8, thereby preventing any run-on of powder. However, reversing the auger forces powder towards the rear bushing, and thus increases wear and tear on the bushing, auger mechanism and possibly the motor driving the auger.

Figure 2:
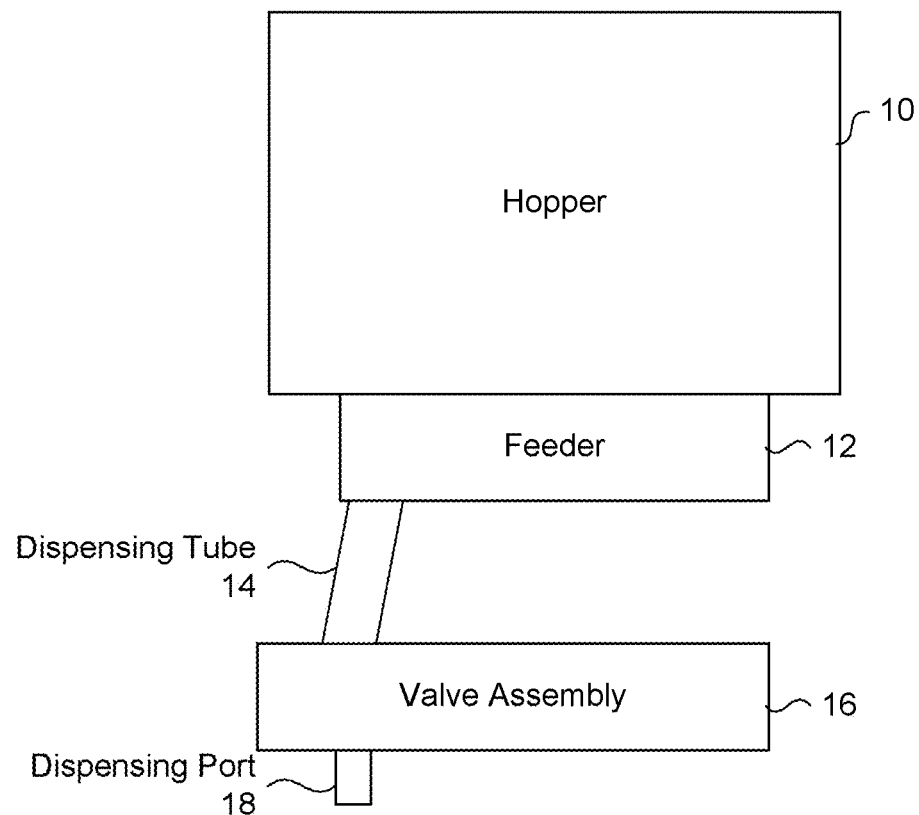

FIG. 2 is a block diagram embodiment of a dispensing apparatus as disclosed herein. The dispensing apparatus includes a hopper 10 for storing granular material. The granular material may be a powder, for example, a powdered non-dairy creamer, a flavouring, or a sweetener such as a sugar, or a sugar alternative. A feeder 12 is coupled to the hopper and functions to transfer the granular material from the hopper to a hopper outlet (not shown) that is coupled to a dispensing tube 14. The dispensing tube 14 is sloped such that the granular material travels along the bottom surface of the dispensing tube rather than bouncing off the sides of the tube in a scatter pattern. Valve assembly 16 is coupled to the dispensing tube and controls the dispensing of the granular material. Valve assembly 16 also functions to prevent inadvertent dribbling of granular material by the feeder when the dispenser is accidentally jostled. The valve assembly receives a resilient portion of the tube, and is actuatable to pinch the resilient portion of the tube to inhibit passage of the granular material to a dispensing port 18, and to unpinch said resilient portion of the tube to enable passage of the granular material through the dispensing port 18 to a vessel (not shown) positioned below the dispensing port 18. The vessel may be a cup, glass, plate, box, bowl, or any vessel that a user wishes to fill.

An example operation of the dispensing apparatus of FIG. 2, according to a present embodiment, is now described. At the beginning of the dispense, the valve (not shown) is in a closed (or loading) position to prevent any material from exiting the dispensing tube 14 to the dispensing port 18. In response to a signal from a user, the feeder 12 transfers an initial amount of the granular material into the dispensing tube 14 in a loading step. The sloped dispensing tube 14 prevents the granular material from freely scattering within the volume of the tube 14 as gravity keeps the material on the underlying sloped surface. This helps to columnate the granular material. As will be described later, a sloped dispensing tube 14 can be curved or angled. The feeder may be an auger, a plunger or other mechanism for delivering granular material that is known in the art. The granular material is retained in the dispensing tube above the valve before the valve is opened. The valve is then opened and the granular material is dispensed through the dispensing port 18.

By providing a sloped tube any potential overspray of the dispensed material can be reduced. Without being bound by theory, it is believed that by holding the granular material at the valve and releasing it closer to the dispensing port 18, the material has less distance to travel and scatter to strike the sidewalls of dispensing tube 14. Accordingly, the dispense pattern of the granular material is more columnated relative to a configuration where the material falls unstopped to the dispensing port 18. Thus, when the valve open time is delayed with respect to feeding, and a sloped tube is provided, the amount of granular material that is scattered on the surface around the vessel is reduced. Reducing the amount of sugar that is scattered on the counter leads to less waste of product and less clean-up effort.

The amount to be dispensed may be a pre-determined amount that is dependent upon a user's request. For example, a user may select an input of one "serving" of sugar which may correspond to 1 gram of sucrose. In such a case the predetermined amount is 1 gram and a control unit will instruct the feeder to dispense a volume corresponding to 1 gram of sucrose. When the amount to be dispensed is "pre-determined", the "initial amount" that is fed into the feeder is equal to or less than the pre-determined amount.

When the dispenser is configured to dispense a pre-determined amount, the feeder may be an auger, such as an auger described in U.S. Pat. No. 8,622,257, which is incorporated herein by reference. A person of skill in the art would understand that the distance between the flights, or uprights, in the auger and pitch of the flights may be adjusted to discharge a pre-determined quantity of granular material. One full revolution of the auger can be calibrated to dispense the granular material in a single pitch of the flight. A control unit relays a signal from the user (such as the touch of a button on the user interface) to a motor unit controlling the auger, signaling to the motor to rotate the desired number of rotations to dispense the amount requested by the user. The motor controlling the feeder may be a gear motor, stepper motor, or any suitable motor known in the art that is capable of driving the feeder. Stepper motors are known in the art and examples may be found in U.S. Pat. No. 8,622,257.

The dispensing tube has at least a resilient portion but may be made entirely of a resilient material. By "resilient" it is meant that the material is deformable and squeezed shut by the valve assembly 16 such that the tube can be closed to inhibit the passage of granular material. The resilient material must be capable of reliably returning to its original form following the pinching (i.e. a form that allows the passage of powdered material when the pincher is released). Examples of resilient materials suitable for use as the resilient portion of the dispensing tube (or the entire dispensing tube) include, but are not limited to Kryton™, silicon tubing, Tygon™ tubing and surgical tubing. In certain embodiments the dispensing tube may include portions that are made of other materials that are not resilient. However, at least the portion of the tube that operated on by the valve assembly 16 can be resilient.

As previously mentioned, the dispensing tube portion between the outlet of the hopper and the valve assembly 16 has at least a sloped portion. The sloped tube portion may have a curved shape, for example it may be arcuate, or it can be angled. The distance between the outlet of the hopper and the valve assembly is set to a minimum length to allow for the temporary storage of all or a portion of the amount of granular material to be dispensed.

Figure 3:
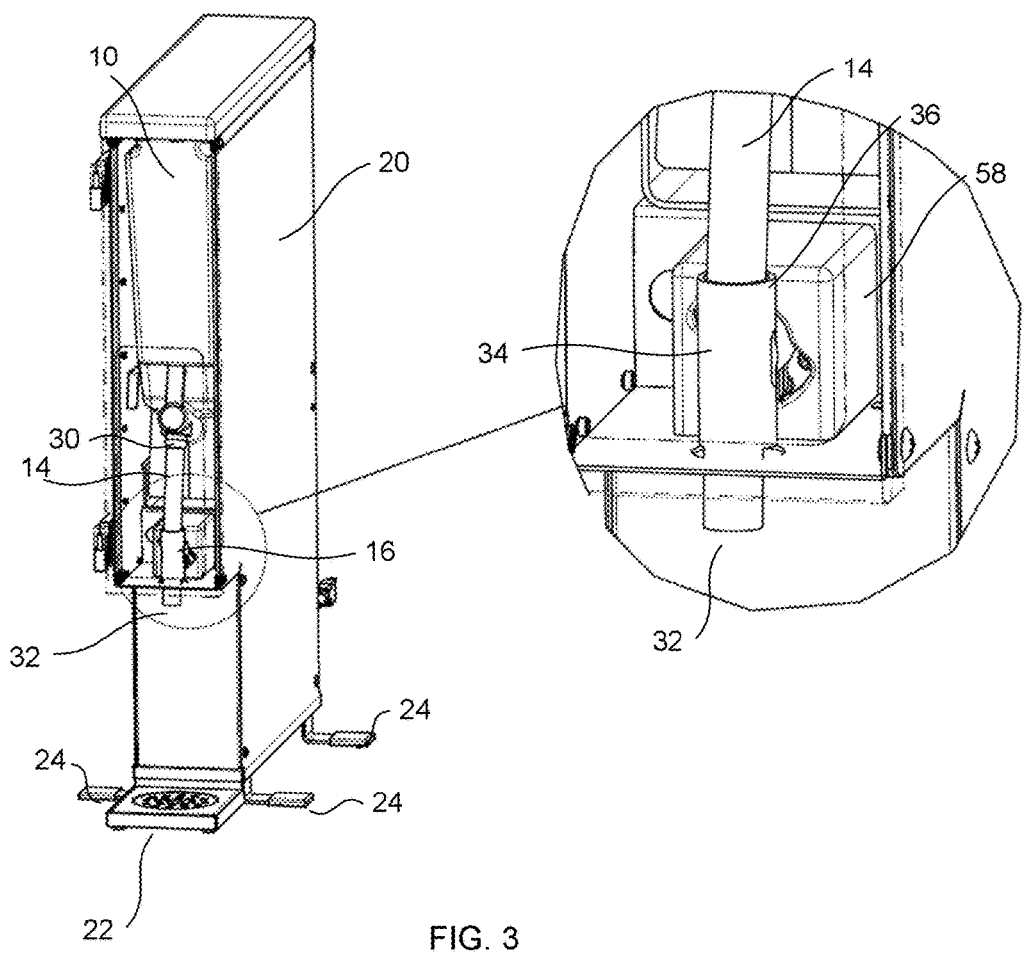
FIG. 3 is a front perspective view of an embodiment of a powder dispensing system according to an embodiment.

FIG. 3 is a front perspective view of a dispensing apparatus according to an embodiment of the invention. The dispensing apparatus includes a chassis 20 made of a rigid material such as, for example, stainless steel or a plastic. The chassis 20 is configured to include a receptacle 22 upon which a user may place a cup, bowl, or other vessel for receiving granular material dispensed from the apparatus. Chassis 20 includes support members 24 for supporting and levelling the dispensing apparatus on a flat surface, such as a counter. The chassis may include a hinged door (not shown) whereby a user can access the interior of the chassis assembly for maintenance, cleaning, or refilling purposes. Alternatively, the door may clip on through tab members, may slide into place along a track or may be attached through any other nonpermanent fastening means. In addition, alternate embodiments allow access to the interior of the chassis through removable side, top or back panels of the chassis 20.

The interior of the chassis is shaped to house a hopper 10, which contains a granular material, such as a powder, to be dispensed. In this embodiment, the base of the hopper (not shown) is inclined upwards relative to the flat receptacle 22 from the back of the dispenser toward the hopper outlet 30. In other words, the auger is inclined in a manner shown in FIG. 1. The door may also include a positioning member on its inner surface. The positioning member abuts the hopper when the door is in a closed position. After insertion of the hopper into the chassis, the protrusion pushes against the hopper as the door is closed and serves to guide the hopper into position in the chassis.

The hopper 10 has an increased width compared to hoppers of the prior art. The increased width of the hopper allows for easier loading of the sugar and a reduction in the frequency of refilling that is required. This is particularly advantageous during busy periods when workers are busy waiting on customers. The hopper 10 may be removable from the chassis for cleaning, maintenance or refilling. In some embodiments, the hopper 10 may be "fill-in-place", in that the hopper may be refilled without removal of the hopper from the chassis. A dispensing tube 14 is removably attached to the hopper outlet 30 and is inserted into the valve assembly 16 (shown in the inset) terminating in a dispensing port 32.

In this embodiment, the feeder (not shown) is an auger that is rotatable in the inclined bottom section of the hopper. The auger is driven by a motor unit that is in turn controlled by a control unit in response to a signal from a user. The control unit controls the motor to rotate the auger in a first direction for dispensing the powder, and to stop the auger when the powder has been released into the dispensing tube 14.

In this embodiment, the dispensing tube 14 is made completely of a resilient material and is secured to the hopper outlet 30 by friction fit by engaging a barb on the hopper outlet (not shown), facilitating easy release of the dispensing tube for cleaning or for replacement. However, there are many means of securing the dispensing tube to the hopper outlet that may be used. For example, the dispensing tube may comprise a threaded adaptor section that mates with a corresponding receiving member on the hopper outlet to connect the dispensing tube to the hopper. The dispensing tube may also have a snap fit engagement with the hopper outlet or any other connecting means known in the art.

In this embodiment, the auger is positioned at an 18 degree angle relative to the receptacle 22. A person of skill in the art would understand that the receptacle 22 is flat and parallel to the ground or supporting surface to ensure that the cup or vessel to be filled does not fall off. The supporting surface may be, for example, a counter, a table or shelf, which are usually mounted substantially parallel to the ground.

The dispensing tube 14 is arranged to include a sloped portion between the hopper outlet 30 and the valve assembly 16. In this particular embodiment, the resilient material of the dispensing tube 14, allows flexing of the tube to form a curved portion between the hopper outlet 30 and the valve assembly 16. The curve of the dispensing tube is determined by the position of the hopper outlet 30 relative to the valve assembly 16. Hopper outlet 30 is positioned so that it is angled to be non-vertical relative to 22, and positioned behind 16, i.e. towards a back surface of the dispenser and away from the receptacle 22.

The flexing of the dispensing tube 14 promotes sliding of the granular material along the inner surface of the dispensing tube (i.e. the bottom surface of the tube) as opposed to scattering of the granular particles which occurs when a tube is arranged vertically relative to 22 and the particles drop through free air. Sliding of the granular material along the curved path of the dispensing tube focuses the flow profile and reduces the amount of sugar particles that end up missing the vessel. The sugar will slide along the tube under gravity as opposed to bouncing off the sides of a vertical drop.

The inset of FIG. 3 shows the mounting of the dispensing tube 14 in the valve assembly 16. Valve assembly 16 includes a valve body 34 defining a passage 36 for receiving the dispensing tube 14. Dispensing tube 14 passes through the passage 36 and terminates in dispensing outlet 32. The dispensing outlet 32 is directed to dispense the granular material vertically from the dispensing tube 14 into a vessel positioned on receptacle 22. The valve body 34 includes a pinch valve. Many types of pinch valves are known to a person of skill in the art. Examples of pinch valves may be found in U.S. Pat. No. 3,539,081, and U.S. Publication No. 2012/0325860, which are herein incorporated by reference. The valve body 34 is releasably connected to a motor and motor housing 58 and receives a pinch bar moved by the motor, to be shown in more detail in FIG. 4. Valve body 34 includes a stop plate (not shown) which is a portion of an inner surface of the passage (36) that is in alignment with a pinch bar, such that when the pinch bar is placed into a loading position the pinch bar engages the dispensing tube, pressing it against the stop plate and thereby closing the dispensing tube.

Figure 4:
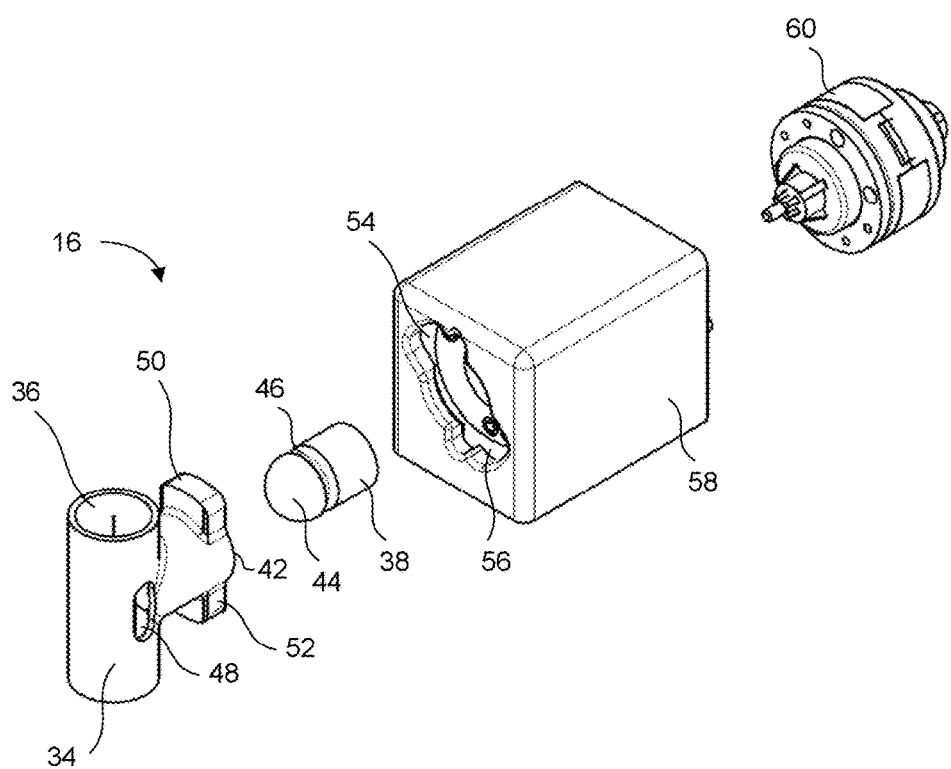
FIG. 4 is an exploded view of a motor, housing, pinch bar and T-shaped valve housing of the embodiment shown in FIG. 3.

FIG. 4 is an exploded view of the valve assembly 16 and the motor housing of the embodiment shown in FIG. 3. Valve body 34 defines a passage 36 comprising a longitudinal and cylindrical shaped opening through which the dispensing tube 14 passes. To install the dispensing tube 14 in the dispenser, the dispensing tube 14 is placed through passage 36 in the valve body and secured to the hopper outlet (not shown). Alternatively, the dispensing tube may be first secured to the hopper outlet and then passed through the passage 36. When installed, the resilient portion of the dispensing tube is aligned with a stop plate which is provided by an inner wall surface of the passage 36. Valve assembly 16 also includes pinch bar 38 and channel 42 that is configured to receive pinch bar 38 and guide pinch bar 38 in a substantially horizontal path between a closed position and an open (or dispensing) position. In this embodiment, the pinch bar channel 42 is substantially perpendicular to the longitudinal opening, passage 36.

The movement of the pinch bar from the valve open (or dispensing) position to the valve closed (loading) position is controlled by a driving motor, which, in this embodiment, is worm gear motor 60 having an anti-rotation mechanism. Those skilled in the art will appreciate that the driving motor can be any motor capable of providing a torque. In alternate embodiments, any type of motor and mechanism used for advancing and withdrawing the pinch bar can be used. A threaded drive rod (not shown) is in threaded engagement with motor 60 and is connected at one end to the pinch bar 38. The pinch bar 38 may have a threaded hole that allows the threaded rod to be screwed to the pinch bar. In response to a signal from the control unit (not shown), the motor 60 controls the lateral movement of the pinch bar within the channel from a closed position to an open (or dispensing) position.

The pinch bar 38 is pushed by the motor 60 to generate sufficient force to cause the dispensing tube to collapse upon itself and prevent granular material from flowing through the dispensing tube when the pinch bar tip 44 pushes the dispensing tube against the stop plate. In this position, the pinch bar 38 can be said to be in a pinched or closed position. By reversing the motor, the pinch bar can be moved to an open, dispensing position, wherein the pinch bar is retracted from the stop plate, allowing the dispensing tube to regain its original shape and allow the passage of granular material to the dispensing outlet.

In this embodiment, the tip 44 of the pinch bar is rounded to match the rounded surface of the stop plate. This ensures full closure during pinching while at the same time pinching with the minimum amount of force and damage to the tube. Pinch bar 42 has a circumferential groove 46 that allows for clearance of the dispensing tube when the pinch bar is in the pinch or loading position. Valve body 34 also includes a pair of oppositely facing apertures 48, of which only one is shown in FIG. 4, positioned in horizontal alignment with the stop plate, which allow the dispensing tube 14 to flex outwards when the dispensing tube is being pinched by the pinch bar 38.

The body 34 of the valve assembly includes a set of two tabs 50, 52 at the distal end of the pinch bar channel 42, which align with apertures 54, 56 in motor housing 58 and permit coupling of the valve body to the motor housing 58. Once tabs 50, 52 are aligned with the apertures 54, 46, the valve body 34 is twisted clockwise to engage the motor housing 58 and secure the valve body to the motor housing 58. A locking mechanism is engaged when the valve body is twisted in a clockwise direction to keep the tabs from counter rotating in the opposite direction, and the valve body from falling out.

Figure 5:
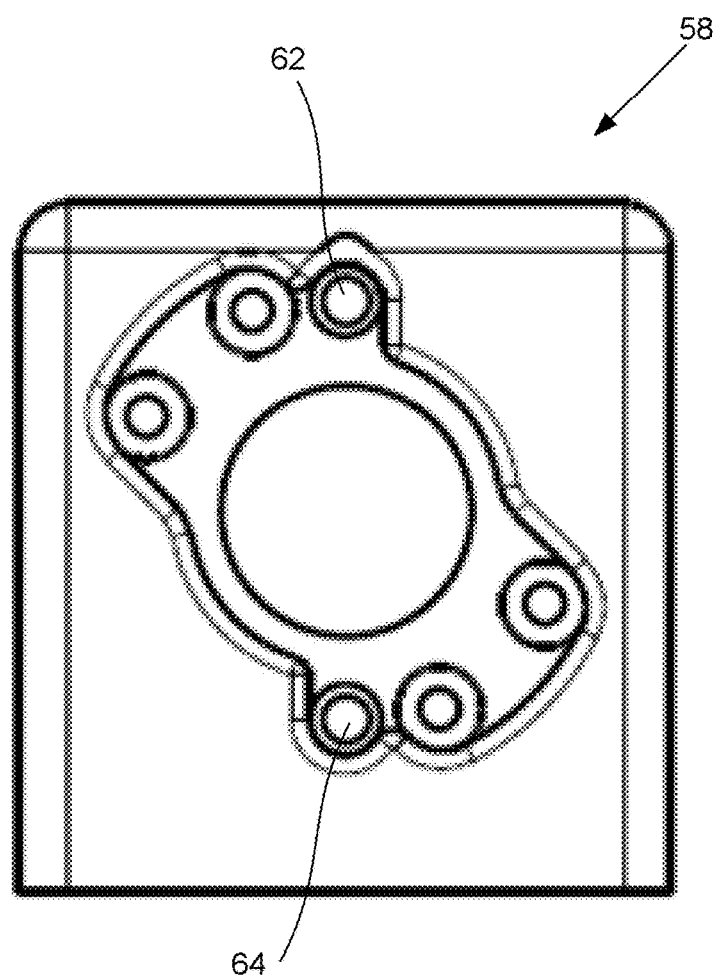
FIG. 5 is a front view of the motor housing shown in FIG. 4.

FIG. 5 is a front view of the motor housing shown in FIG. 4. According to an embodiment of the present aspect, the valve body further includes a first mating part including an indent (shown in FIG. 6) on each tab and the motor housing 58 includes a corresponding second mating part including ball detents 62 and 64, where the second mating part releasably mates to the first mating part. Preferably, the first mating part and the second mating part are self-aligning with respect to each other.

Figure 6:
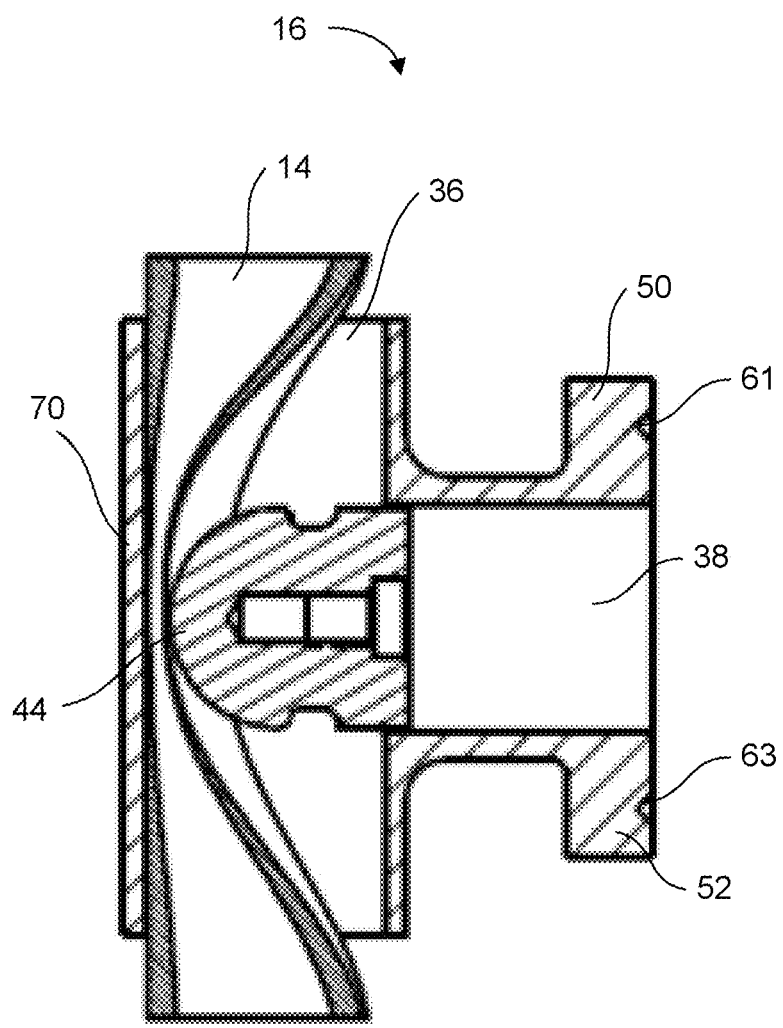
FIG. 6 shows the valve in a closed position.

FIG. 6 is a cross section drawing showing the valve assembly of FIG. 4 in a closed position. The same reference numbers refer to the same previously described features. In the closed position, the rounded tip 44 of pinch bar 38, presses dispensing tube 14 against the stop plate 70 in the cylindrical passage 36, closing the tube and inhibiting the dispensing of any granular material through the tube. As previously described the rounded head portion 44 of pinch bar 38 ensures a full closure during pinching while minimizing the amount of force required, thereby limiting the amount of damage to the dispensing tube 14. Tabs 50, 52 comprise indents 61, 63 which mate with ball detents in the motor housing to secure or lock the valve body to the motor housing.

Figure 7:
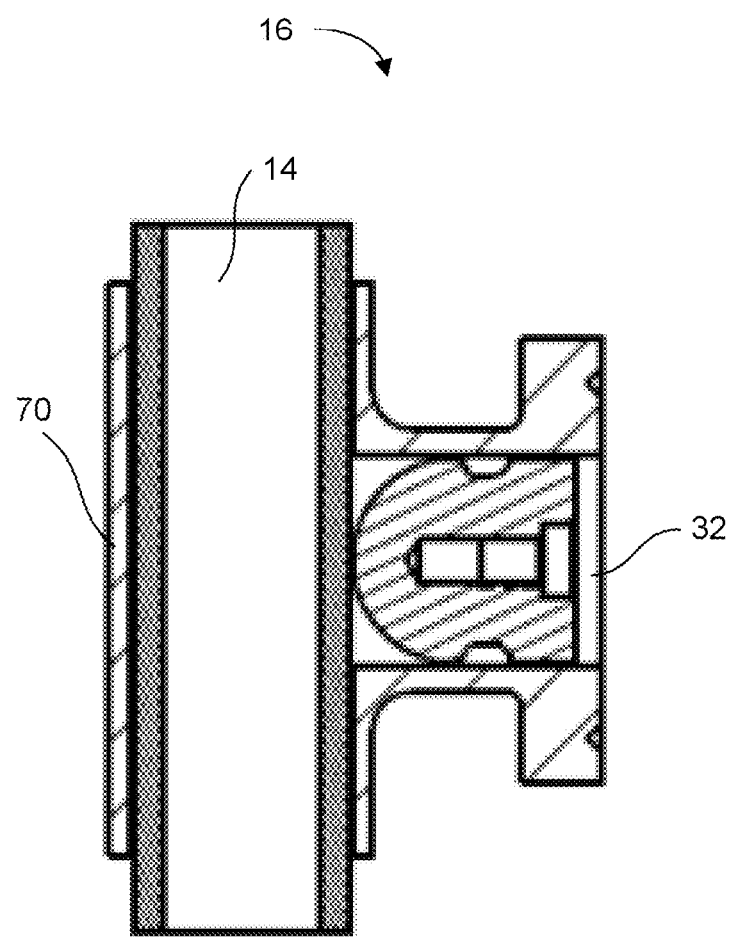
FIG. 7 shows the valve in an open position.

FIG. 7 is a cross section drawing showing the valve assembly 16 of FIG. 4 in an open, or dispensing, position. In this position the pinch bar is reversed, i.e. moved away from the stop plate 70, so that the pinch bar is no longer pressing on the tube. The resilient portion of the dispensing tube 14 is released and the valve opens, allowing the dispensing of the granular material that has accumulated in the tube above the valve, following rotation of the auger that delivers powder from the hopper.

Figure 8:
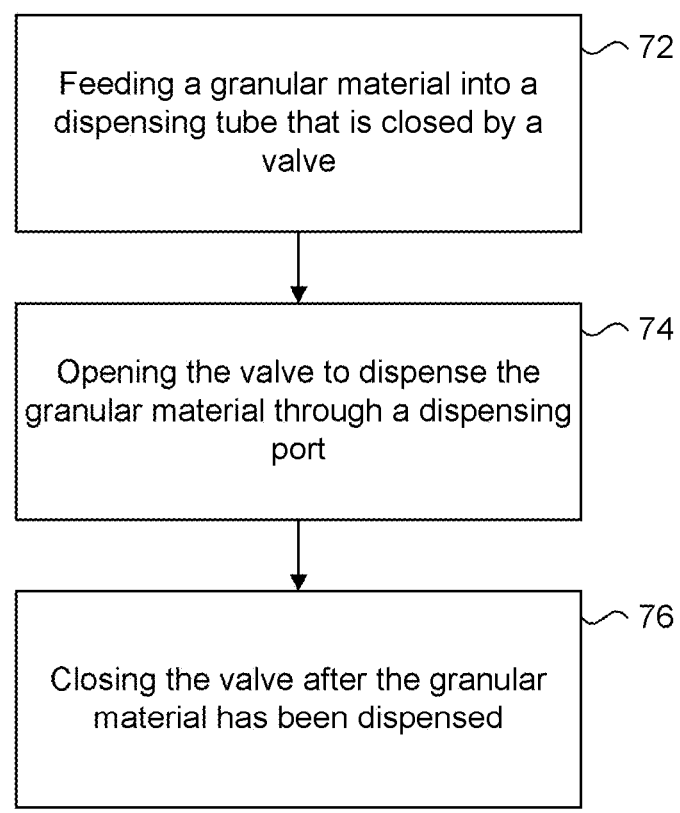
FIG. 8 shows a flow chart of a method of dispensing according to an embodiment.

FIG. 8 shows a flow chart of a method of dispensing according to an embodiment of the invention. The method may be used with the dispensers disclosed herein, however, the steps are defined with specific reference to the features shown in FIGS. 2 and 3. At step 72, pinch bar 38 is in a closed position in which it presses a sloped dispensing tube 14 against a stop plate and inhibits the passage of the granular material through the dispensing tube 14 to dispensing port 32. An initial amount of the granular material to be dispensed is fed into the sloped dispensing tube. The opening of the valve is delayed until feeding has commenced, and at step 74, the valve is opened by moving the pinch bar 38 away from the dispensing tube 14, allowing the dispensing of the granular material through the dispensing port 32. At step 76, the valve may then be closed to prevent the dispensing of any granular material from the dispensing tube if the machine is jostled when not in use.

The method may be used to dispense one or more different pre-determined amounts of granular material. When the amount to be dispensed is predetermined, the feeding step 74 includes rotating an auger to build up an initial amount of the granular material at the valve. This decreases over spray as the granular material is columnated at the start of the dispense. In one embodiment of the presently described method, the valve is opened before the entirety of the predetermined amount is delivered by the auger. Alternately, the valve is opened after the entirety of the predetermined amount is delivered by the auger into the dispensing tube.

Once the predetermined amount has been fed into the dispensing tube, rotation of the auger is stopped and the valve is closed, ending the dispense. The step of closing of the valve can include actuating a pinch bar to pinch a resilient portion of the dispensing tube and to inhibit the passage of granular material through the dispensing port. In one embodiment, the valve may be closed at a delayed time after the auger has stopped. In another embodiment there is no delay, and the valve closes at the same time the auger stops.

The chassis 20 may include a user interface allowing a user to select the quantity of granular material to be dispensed. The quantity of material that a user may request will vary depending on the beverage, and the taste requirements of the user. In operation, the user's input is transferred to a control unit which is electrically connected to a motor that controls the feeder 12 and to a motor that controls the valve assembly 16. The user interface may include a display for displaying options to the user, where the display is a liquid crystal display and the user interface includes button actuators or a capacitive film sensor. Any type of user interface can be used. The predetermined quantities of granular material to be dispensed can be pre-programmed in the controller to correspond to any selection made on the user interface. The processor can be configured to execute a control algorithm in accordance with the inputs from the user in order to obtain a driving signal. A motor driver receives the driving signal from the processor and controls the motor in accordance with the driving signal. In response to a signal resulting from a selection from the user interface, the control unit signals to the feeder to dispense the predetermined amount corresponding to the selection. Once the time required to feed a loading amount of the granular material into the dispensing tube has elapsed, the control unit signals to the driver of the pinch bar motor to move the pinch bar into the dispensing position allowing the dispensing of the granular material. The control unit signals to the motor unit to stop the feeding once the predetermined amount of granular material has been fed to the dispensing tube. The control unit signals to the valve motor to close the valve (i.e. move the valve into the loading position) when the predetermined material has been dispensed from the dispensing port 32.

The control unit may be placed into a maintenance mode whereby a technician or employee of the retailer may program the control unit to interpret the user's input differently. For example, one "serving" of sweetener may correspond to 1 gram of sucrose, but only 50 mg of saccharine. If a dispensing unit contains sucrose, the user's request for one serving of sweetener must be interpreted by the control unit in such a way that it instructs the sucrose dispensing unit to dispense the requisite 1 gram. Later, if the sucrose in the hopper is replaced with saccharine, the control unit would have to be reprogrammed to instruct the dispensing unit to dispense only 50 mg.

Figure 9:
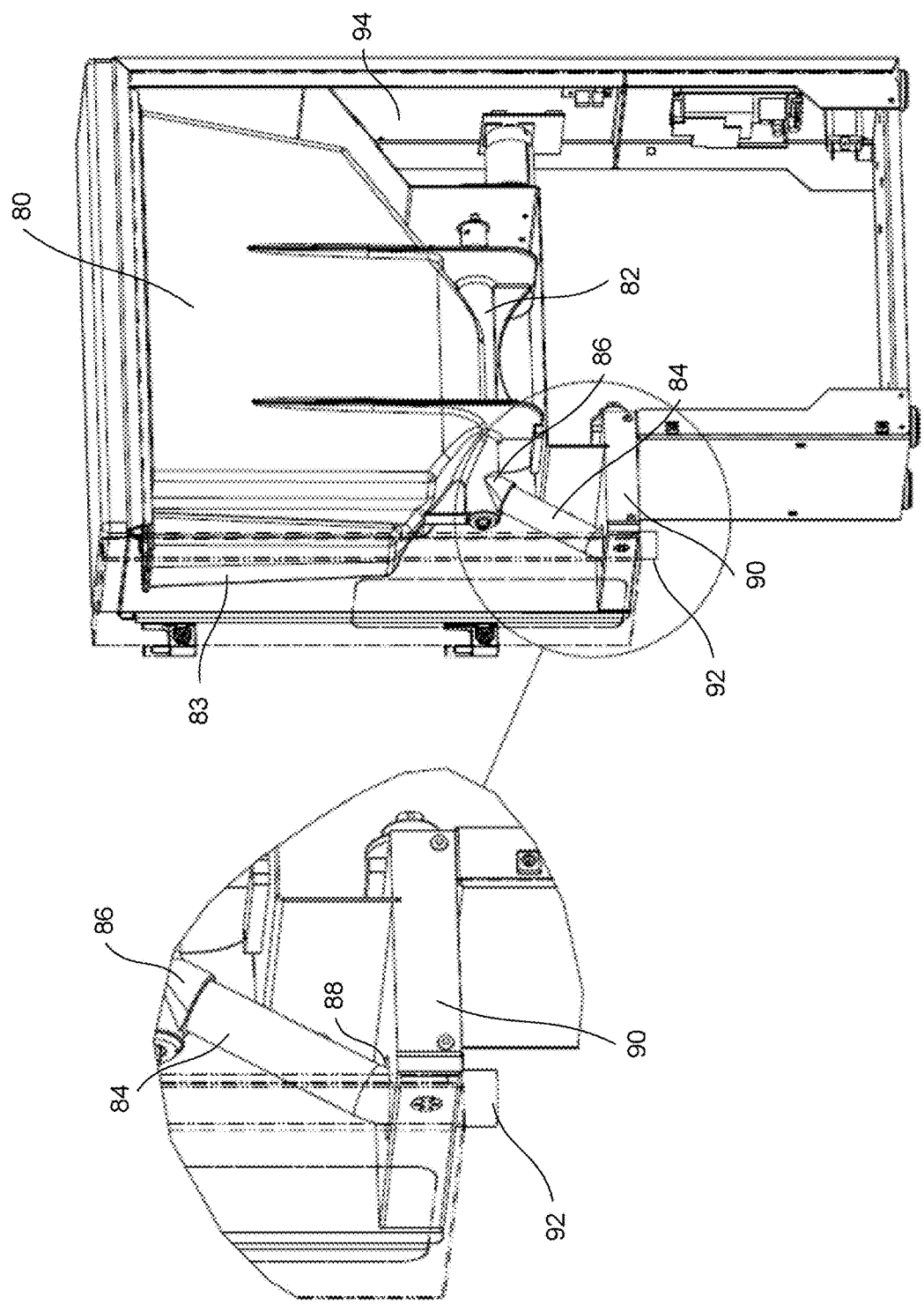
FIG. 9 is a perspective view of an alternate embodiment of a dispenser for granular material.

FIG. 9 is a perspective view of an alternate embodiment of the invention in which the auger is positioned horizontally with respect to receptacle 22 shown in FIG. 3. A person of skill in the art would understand that receptacle 22 is positioned horizontally with respect to the supporting surface, such that a vessel would be supported. FIG. 9 functions similarly to the embodiment shown in FIG. 3. Hopper 80 includes a base 82 that houses the horizontally positioned auger. The hopper 80 comprises a handle 83 that is shaped to allow a user to easily grip the hopper allowing ease of removal of the hopper. The handle 83 comprises a raised center portion and a recessed portion on either side of the raised portion that are each sized to receive a user's fingers, allowing the user to securely grasp and remove the hopper. Any handle that would allow ease of removal of the hopper may be used. In this embodiment, the dispensing tube 84, is friction fit over hopper outlet 86 of hopper 80. It is clearly shown in FIG. 9, that the tube-receiving passage 88 in the valve assembly 90 is offset horizontally from the hopper outlet 86, i.e. it is positioned towards the front of the dispenser, and in a direction toward a user relative to the hopper outlet 86. As a result, dispensing tube 84, has a sloped path between the hopper outlet 86 and the valve assembly 90 and then follows a vertical path as it passes through the tube-receiving passage 88 to the dispensing port 92. In this specific example, the dispensing tube 84 is straight and angled relative to a flat surface supporting the dispenser. As described earlier, sloping of the dispensing tube 84 provides a better flow pattern as the granular material follows the sloped path of the dispensing tube. The angling of the dispensing tube prevents the scattering of the granular particles as they travel through the dispensing tube. This promotes a more consistent and accurate dispense with less of the dispensed material being wasted by being scattered outside a cup, bowl or receptacle that is positioned to receive the dispensed material. The sloping also eases insertion of the dispensing tube into passage 88. The hopper outlet 86 is positioned a first distance from the back panel 94, and the passage 88 underneath is positioned at a second longer distance from the back panel. Therefore the tube will be sloped from the hopper outlet 86 to the passage 88 that receives the dispensing tube 84. In an embodiment, the hopper outlet and the valve passage can be further offset horizontally (i.e.), with the result of a decreased flow rate. A person of skill in the art will understand that varying the horizontal distance between the hopper outlet and the passage will increase or decrease the slope of the dispensing tube 84. A person of skill in the art would also understand that the angle of the slope will determine the flow rate of the granular material and would be able to determine the distances that would provide the desired flow rate. The vertical distance between the hopper outlet and the valve assembly may also be varied to change the slope of the tube and to alter the flow rate. In an embodiment, the angle of the dispensing tube at the hopper outlet is 30° from vertical, and the length of the dispensing tube between the hopper outlet and the dispensing outlet is approximately 4.5 inches. However, as described above, the angle and length of the tubing may be varied depending on the desired flow rate.

Positioning the auger horizontally eliminates the downward migration of sugar into the rear bushing which results in wear of the rear bushing. In this embodiment, the valve assembly comprises a valve block 80, which is seen in more detail in FIGS. 10 to 12.

Figure 10:
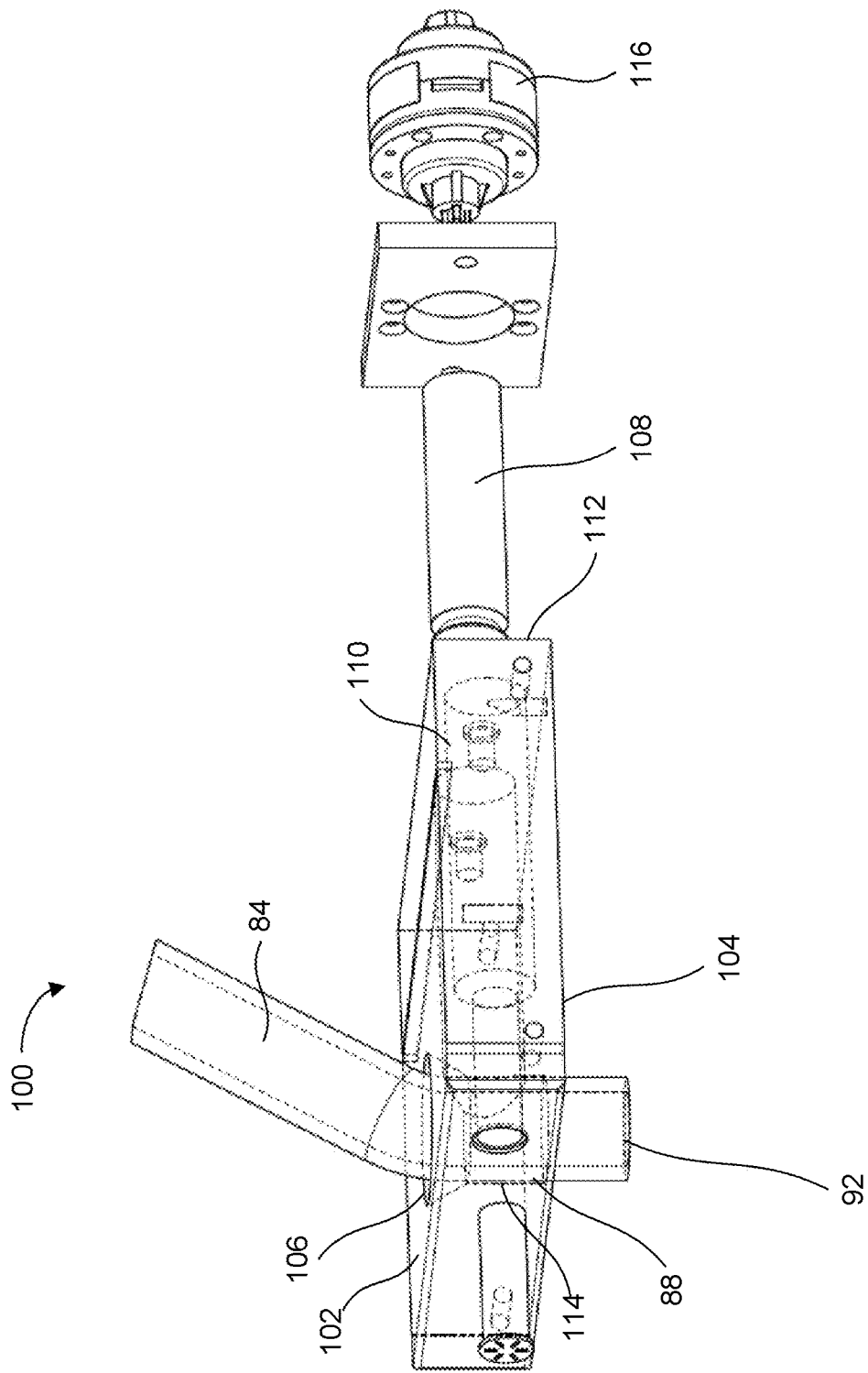
FIG. 10 is an exploded perspective view of a pinch valve and motor assembly of the dispenser of FIG. 9, according to an embodiment.
Figure 11:
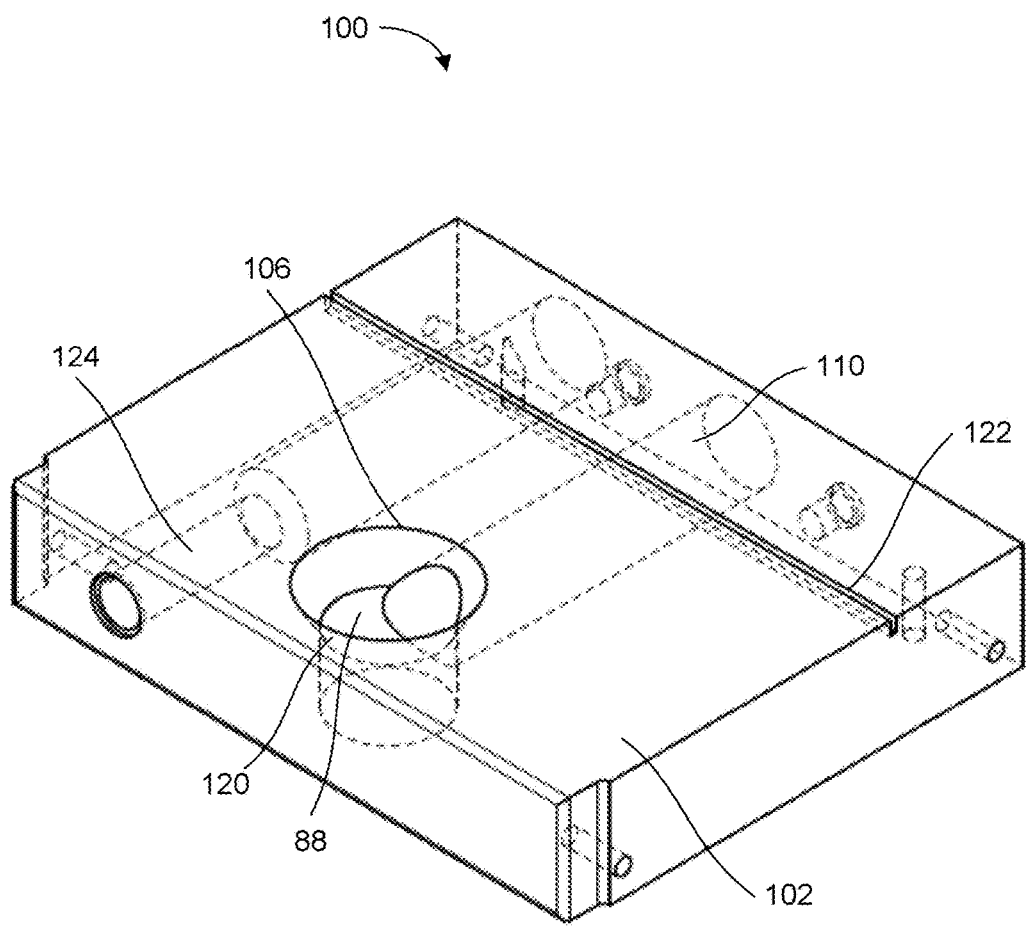
FIG. 11 is a perspective view of a valve block according to an embodiment.

FIGS. 10 and 11 are exploded perspective views of the valve assembly and motor assembly according to the embodiment shown in FIG. 9. In this embodiment, the valve assembly includes a valve block, shown generally as 100. The valve block is made from a rigid material, such as a metal or a plastic. Valve block 100 defines a passage 88, through which the resilient portion of the dispensing tube 84 passes. The passage 88 is cylindrical and has an opening on each of the upper 102 and lower surfaces 104 of the valve block 100. The opening 106 on the upper surface 102 is beveled, which accommodates bending of the tube and allows for easier insertion of tube through the opening 106 of the passage 88. In this embodiment, the stop plate (shown generally at 114) is formed by an inner surface of the passage 88. As a result the stop plate 114 is semi-circular or curved in shape. The tube-receiving passage 88 is sized to be slightly larger than the circumference of the dispensing tube 84, allowing for ease of insertion of the dispensing tube and for efficient deformation and closing of the dispensing tube when a compressive force is exerted in response to engagement of the pinch bar 108 with the stop plate 114. As previously described, the pinch bar 108 may have a rounded head portion which is shaped to engage the curved surface of the stop plate.

The valve block also defines a channel 110 for receiving and guiding the pinch bar 108. In the embodiment shown in FIG. 10, the channel 110 extends substantially horizontally through the valve block 100 from an end 112 to the passage 88 defined in the valve black that receives the dispensing tube 84. The channel 110 is sized to receive the pinch bar 108. In this embodiment, the length of the channel corresponds to the length of the pinch bar and the circumference of the channel is greater than the circumference of the pinch bar to allow the free sliding movement of the pinch bar 108, while minimizing relative lateral movement of the pinch bar when it moves between the closed, or pinching position and the open, dispensing position. A person of skill in the art will understand that the length of the pinch bar may be altered according to the configuration of the dispensing apparatus. In this embodiment, the pinch bar is of a length sufficient to accommodate the mounting of the motor in the chassis. A person of skill in the art would understand that the size and shape of the channel 110 may be altered to reflect the size and shape of the pinch bar 108. In this embodiment, the passage 88 that receives the dispensing tube 84 is substantially perpendicular to the channel 110 that receives the pinch bar 108. The channel 110 is positioned so that the pinch bar 108 presses the dispensing tube 84 against the stop plate 114 when the pinch bar is in the closed, pinched, position.

A threaded drive rod (not shown) is in threaded engagement with worm gear motor 116 and is connected at one end to the pinch bar 108. The pinch bar 108 may have a threaded hole that allows the threaded rod to be screwed to the pinch bar. In response to a signal from the control unit (not shown), the motor 116 controls the lateral movement of the pinch bar within the channel from a closed position or loading position to an open (or dispensing) position. A motor driver (not shown) is in communication with the processor and with the motor and receives the driving signal from the processor and controls the motor in accordance with a driving signal. The motor shown in this embodiment is a worm gear motor. However, a person of skill in the art would understand that any other type of component that can slide the pinch bar 108 to the closed or open positions within channel 110 can be used. The control of the pinch bar movement in this embodiment is the same as in the previous embodiment.

FIG. 11 is a top perspective view of the valve block 100 shown in FIG. 10. This figure shows the beveled edge 120 of the opening 106 of the tube receiving passage 88 in the upper surface 102. Also shown is the channel 110 for receiving the pinch bar. Valve block 100 includes a groove 122 extending laterally across the upper surface 102 for engaging an edge of the chassis for aligning and stabilizing the valve block within the chassis. Also shown in FIG. 11 is a magnetic reed switch 124 that is in communication with the control unit (not shown). When the door of the dispenser is closed, the magnetic reed switch 124 engages the door and the dispenser is enabled to operate as described. When the door is opened the magnetic reed switch signals to the control unit to retract the pinch bar into the open or dispensing position, so the hopper can be removed. The reed switch also signals to the motor controlling the auger to prevent movement of the auger, thereby preventing accidental dispensing while a user is performing maintenance on the dispenser, for example, cleaning the dispenser or filling the hopper.

Figure 12:
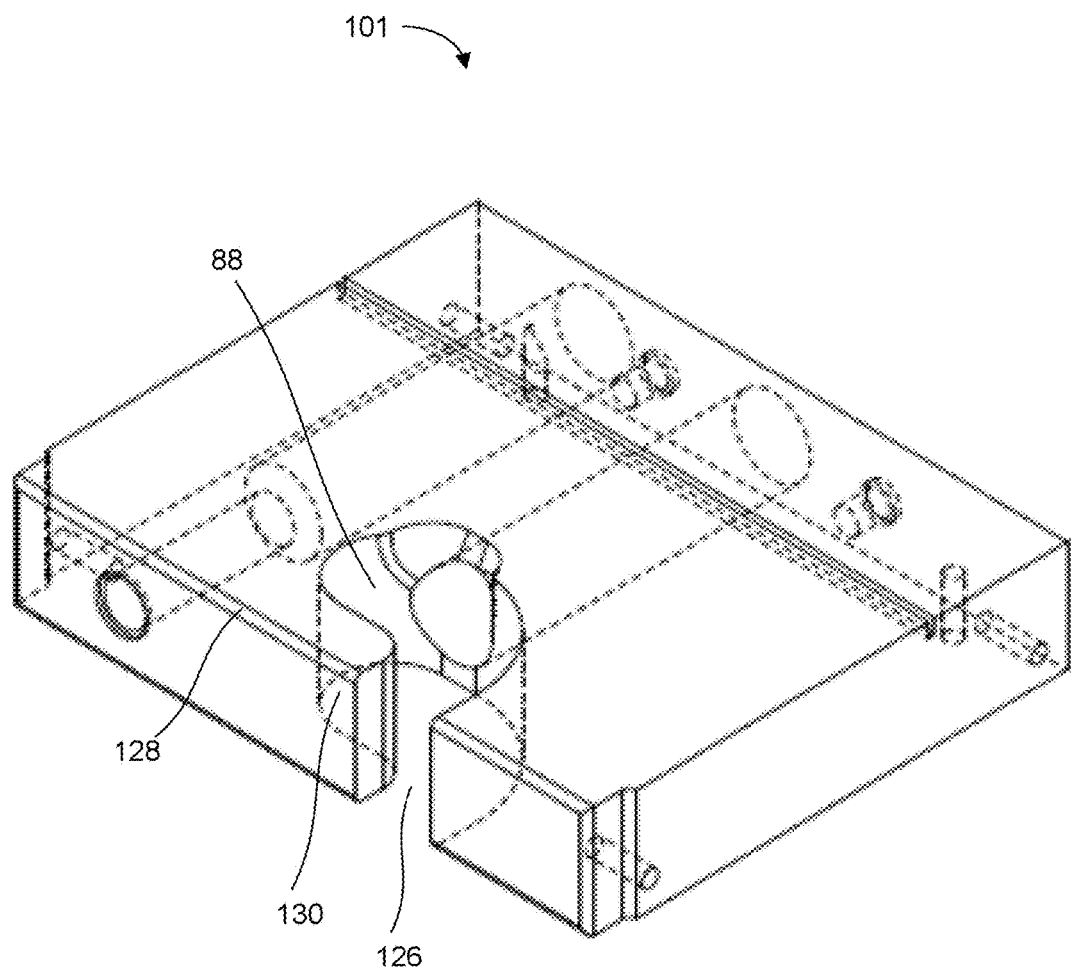
FIG. 12 is a perspective view of a valve block according to a further embodiment.

FIG. 12 is a perspective view of a valve block 101 according to a further embodiment of the invention. The valve block 101 of FIG. 12 is exactly the same as the valve block 100 shown in FIG. 11, except, in this embodiment, the shape of the tube receiving passage 88 is altered to define an aperture 126 that extends to the valve block edge 128 to create a merged opening with passage 88 in a J-shaped, or hook-shaped form. The J-shaped aperture allows easier insertion of the dispensing tube into the valve block, which, in this embodiment comprises an inner surface (shown generally at 130) of the valve block defining the passage 88. The stop plate 130 may be flat or may be curved to seat and retain the tube in alignment with the pinch bar. To insert the dispensing tube into the valve block 101 a user passes the dispensing tube through aperture 126 and positions the tube to be aligned with the pinch bar and the stop plate.

Figure 13:
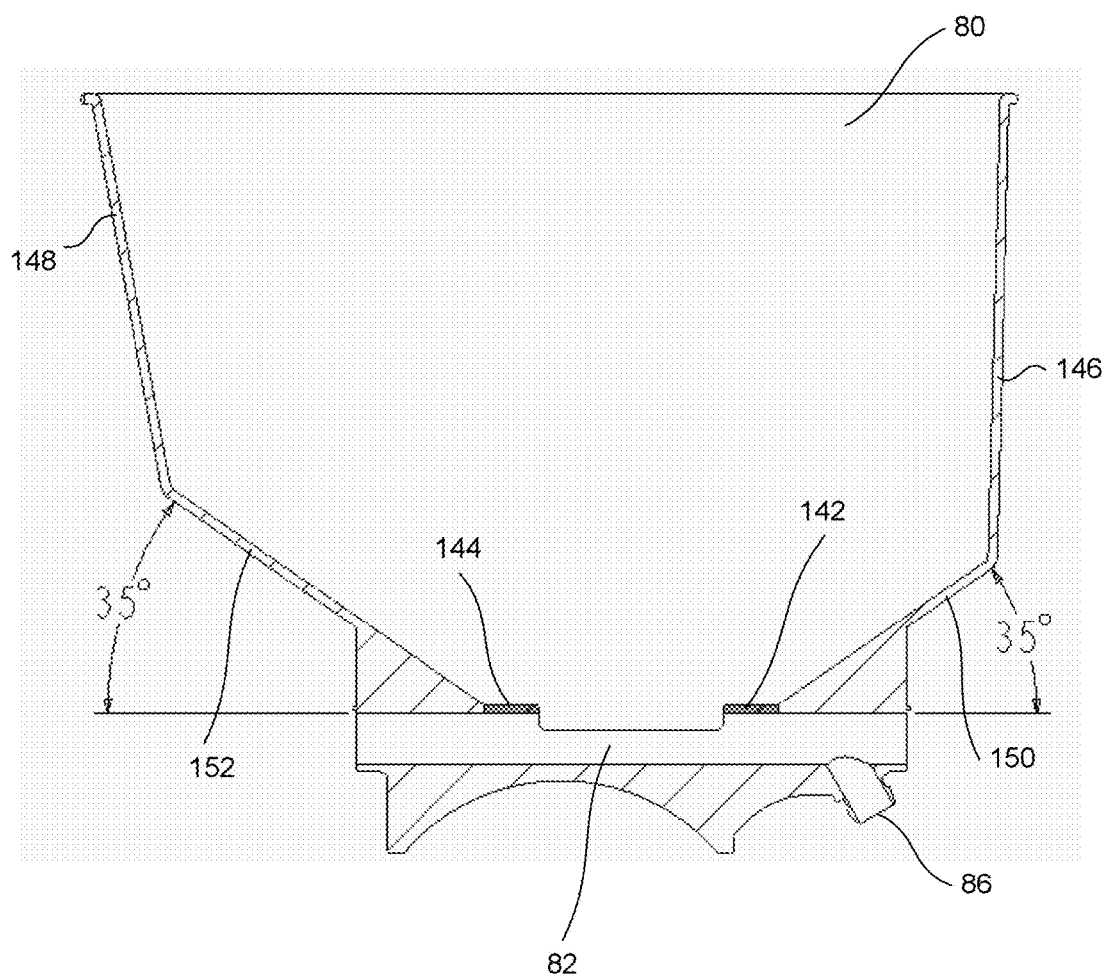
FIG. 13 is a cross-section view of a hopper for use in the embodiment shown in FIG. 9.

FIG. 13 shows a side view of the hopper that may be used in the embodiment shown in FIG. 10. The auger (not shown) is positioned in the base 82 of the hopper 80 and feeds the granular material to the hopper outlet 86. The base 82 housing the auger is sized so that the auger abuts the base 82 but can freely rotate within the base. This positioning prevents the granular material from settling at the bottom of the base. In an embodiment, the hopper base 82 may have a U-shaped cross-section to house the auger. In an embodiment, cover members 142 and 144 are provided in the hopper and function to cover the auger at either end of the auger. Cover member 142 is positioned to cover the end of the auger closest to the hopper outlet 86. Cover member 144 is positioned to cover the end of the auger that is closest to the motor. Cover member 144 functions to direct the granular material away from the portion of the auger below the cover member, thereby reducing the exposure of the rear bushing to sugar. Experimental data has shown that covering a rear portion of the exposed auger with cover member 144 reduces wear on the rear bushing as the amount of particulate material that migrates backwards into the bushing is reduced. Cover member 142 provides a consistent and unperturbed section of the auger to allow the delivery of repeatable densities of granular material from the hopper. In an embodiment, cover members 142 and 144 each cooperate with the corresponding base section to form a tunnel member that surrounds the auger 140. As described above for the base section 82, the cover members may be configured so that the auger abuts an inner surface of the cover member yet freely rotates within the tunnel formed by the cover member and the base section. This configuration increases the accuracy of the feeding of the granular material. When in use, the granular material is directed to the area of the auger that is not covered by the cover members 142 and 144 and is moved by the auger to the hopper outlet 86. Experimental analysis has shown that the rate of wear on the rear bushing can be improved by 800% by positioning the auger horizontally by adding a pinch valve, thereby removing the need for reverse rotation, and by providing a cover member 144 that covers the rear portion of the auger towards the motor.

The sides 146, 148 of the hopper 80 may each include a bottom portion 150, 152 that is angled relative to receptacle 22, or a horizontal supporting surface. It was found that angling the sides of the bottom portion 150, 152 of the hopper to be 28° or greater allows sugar to slide down the sides of the hopper without the addition of outside force. This results in a reduction in sugar buildup in the hopper when the sugar content is low, thereby reducing clumping of sugar and increasing the accuracy of the dispense. In an embodiment, the angle of the bottom portions 150, 152 of the hopper is adjusted to about 35° relative to receptacle 22 or a counter supporting the dispenser. However, a person of skill in the art would understand that the angles of the bottom portion may be varied depending on the type of granular material to be dispensed and in response to temperature or humidity changes.

Figure 14A:
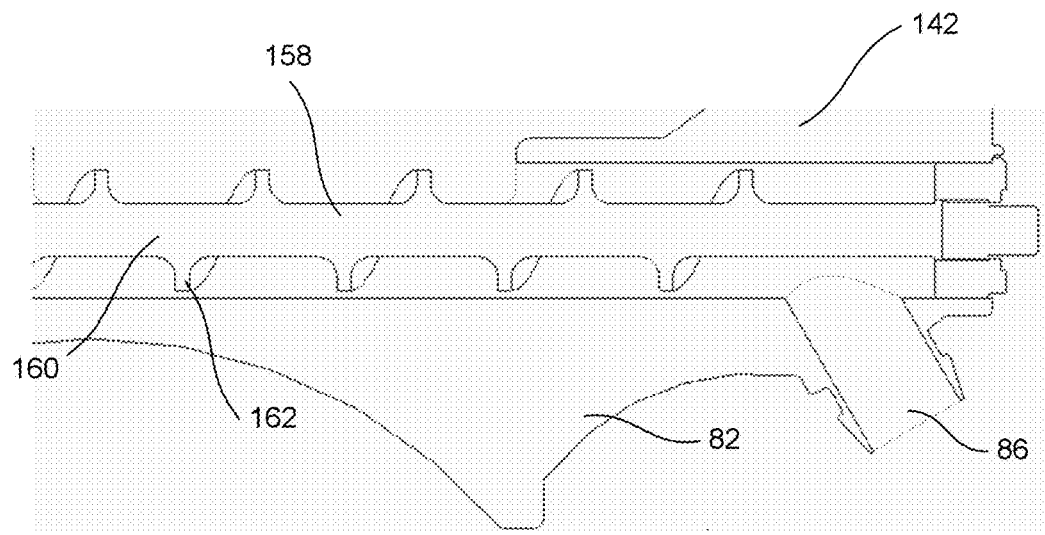
FIG. 14A is a cross-section view of the base of the hopper of FIG. 13 housing an auger, showing a first embodiment of the auger.
Figure 14B:
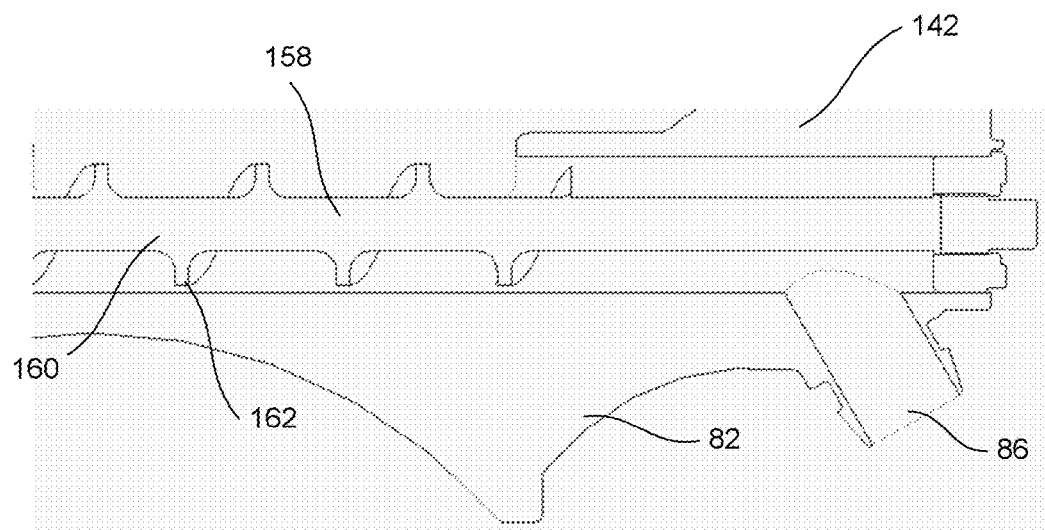
FIG. 14B is a cross-section view of the base of the hopper of FIG. 13 housing an auger, showing a second embodiment of the auger.

FIG. 14A shows a cross section of the base 82 of the hopper shown in FIG. 13 including auger 158. Auger 158 has a shaft 160 and a plurality of flights 162. Cover member 142 is coupled to the hopper and encloses the auger member in the end portion closest to hopper outlet 86. As can be seen in FIG. 14A, the flights of the auger member terminate at or just before the left-most edge of the hopper outlet 86. FIG. 14B is an isometric view of a flight reduced auger member for use with the dispensers described herein. The flights have been removed from the end portion of the auger that is positioned towards the hopper outlet 86. As shown in FIG. 14B, the auger may be modified such that the flights terminate before the hopper outlet 86. In this embodiment, the two flights closest to the hopper outlet 86 have been removed. However, a person of skill in the art would understand that depending upon the size and spacing of the flights, the number of flights that are removed may be adjusted. When installed in the dispensing unit, the end portion, which is flight-free, will be positioned over the hopper outlet 86. The removal of the flights provides a consistent and unperturbed section of the auger to deliver repeatable densities of granular material without the unpredictable end of dispense behaviour where a portion of the flight may or may not dispense depending on the position the auger stops in and relative position of the last flight with respect to the hopper outlet. Cover member 142 covers the portion of the auger exiting the hopper and allows for a longer section of covered auger to provide more consistent filling of the auger and subsequently provide improved consistency in dispense amounts.

The embodiments disclosed herein describe a dispenser having a single hopper for dispensing a single product. It is understood that the dispenser described herein may be adapted to include more than one hopper and more than one product. This is accomplished by including multiple hoppers that each have a feeder, a valve assembly and a dispensing tube as described herein.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A dispensing apparatus configured to dispense a granular material, comprising:
    a hopper configured to store the granular material, the hopper comprising a lower base;
    an auger configured to deliver the granular material in the hopper from a hopper outlet, the auger disposed in the lower base of the hopper;
    an auger cover disposed at the lower base of the hopper and disposed between the auger and the cavity defined by the hopper so that the lower base and the auger cover cooperate to enclose an end portion of the auger;
    a dispensing tube configured to receive the granular material from the hopper outlet and configured to guide the granular material towards a dispensing port; and
    a valve assembly coupled to the dispensing tube and positioned between the hopper outlet and the dispensing port, the valve assembly configured to receive a resilient portion of the dispensing tube,
    the valve assembly being actuatable to pinch the resilient portion of the dispensing tube to inhibit passage of the granular material to the dispensing port, and to unpinch said resilient portion of the dispensing tube to enable passage of the granular material through the dispensing port.

2. The dispensing apparatus according to claim 1, configured to feed a predetermined amount of the granular material from the hopper through the hopper outlet into the dispensing tube wherein the feeding begins when the resilient portion of the dispensing tube is pinched by the valve assembly, and further configured to actuate the pinch valve assembly to unpinch the resilient portion before feeding of the entire predetermined amount of the granular material stops.

3. The dispensing apparatus according to claim 1, wherein the dispensing tube has a curved portion between the hopper outlet to the valve assembly for guiding the granular material in a curved path from the hopper outlet to the valve assembly.

4. The dispensing apparatus according to claim 1, wherein the auger is oriented substantially horizontally relative to a surface supporting the dispensing apparatus.

5. The dispensing apparatus according to claim 1, wherein the auger is oriented at an angle relative to a surface supporting the dispensing apparatus.

6. The dispensing apparatus according to claim 5, wherein the angle is about 18 degrees.

7. The dispensing apparatus according to claim 1, comprising an auger bushing disposed at the end portion of the auger enclosed by the auger cover, wherein the auger cover is configured to direct the granular material in the hopper away from the end portion of the auger to reduce exposure of the auger bushing to the granular material.

8. The dispensing apparatus according to claim 7, wherein the auger bushing is a rear bushing and the apparatus is configured to rotate the auger to move the granular material toward the hopper outlet and away from the rear bushing.

9. The dispensing apparatus according to claim 8, wherein the auger is oriented substantially horizontally relative to a surface supporting the dispensing apparatus.

10. The dispensing apparatus according to claim 1, wherein the valve assembly is a pinch valve assembly and wherein the valve assembly comprises:
    a body comprising a stop plate; and
    a pinch bar assembly configured to move a pinch bar between a closed position and a dispensing position;
    wherein, when the pinch bar is in the closed position the pinch bar presses against the resilient portion of the dispensing tube thereby deforming the resilient portion of the dispensing tube against the stop plate and inhibiting the passage of the granular material to the dispensing port, and when the pinch bar is in the open position, the pinch bar is moved away from the stop plate, allowing the passage of the granular material through the dispensing port.

11. The dispensing apparatus according to claim 10, wherein the body further comprises a valve block, the valve block defining a passage configured to receive the resilient portion of the dispensing tube, and wherein the stop plate is defined by an inner wall of the valve block defining the passage.

12. The dispensing apparatus according to claim 11, wherein the valve block further comprises a channel substantially perpendicular to the defined passage, the channel for receiving the pinch bar and aligning the pinch bar with the stop plate.

13. The dispensing apparatus according to claim 1, wherein the auger cover is shaped and positioned so that the auger rotatingly abuts the auger cover.

14. A method of dispensing a granular material, the method comprising:
  providing a dispensing apparatus comprising a hopper for storing the granular material, an auger disposed in a lower base of the hopper, and an auger cover disposed at the lower base of the hopper and disposed between the auger and the cavity defined by the hopper so that the lower base and the auger cover cooperate to enclose an end portion of the auger;
  feeding the granular material using the auger from the hopper through a hopper outlet into a dispensing tube where a resilient portion of the dispensing tube is pinched closed by a pinch valve;
  opening the pinch valve to dispense the granular material through a dispensing port in the dispensing tube; and
  closing the pinch valve to inhibit the passage of the granular material through the dispensing tube to a dispensing port.

15. The method according to claim 14, wherein the granular material is a predetermined amount of the granular material.

16. The method of claim 15, wherein opening includes opening the valve before feeding of the entire predetermined amount of the granular material stops.

17. The method according to claim 14 wherein the step of closing of the valve comprises actuating a pinch bar to pinch a resilient portion of the dispensing tube, and wherein the step of opening the valve comprises actuating the pinch bar to unpinch the resilient portion of the dispensing tube to enable passage of the granular material through the dispensing port.

18. The method according to claim 14, wherein the granular material travels along a sloped path from the hopper outlet to the valve.

19. The method according to claim 14, wherein the end portion of the auger at which the auger cover is provided comprises a rear auger bushing, and wherein the feeding comprises rotating the auger to move the granular material toward the hopper outlet and away from the rear auger bushing.

20. The method according to claim 19, wherein the auger is oriented substantially horizontally relative to a surface supporting the dispensing apparatus.

* * * * *